Feb. 9, 1943.    McC. SHANK    2,310,656

CELL COVER WITH ELECTROLYTE CONTROL

Filed May 4, 1940

INVENTOR.
McCONNELL SHANK.
BY
Allen & Allen
ATTORNEYS.

Patented Feb. 9, 1943

2,310,656

UNITED STATES PATENT OFFICE 2,310,656

CELL COVER WITH ELECTROLYTE CONTROL

McConnell Shank, Oak Park, Ill., assignor to The Richardson Company, Lockland, Ohio, a corporation of Ohio Application May 4, 1940, Serial No. 333,365

12 Claims. (Cl. 136—177)

My invention relates to cell covers for electric storage batteries, which cell covers are equipped with means to prevent overfilling with water or electrolyte, while providing for the adequate venting of gas from batteries during operation. Broadly my invention relates to that type of structure in which a tubular extension at the filler opening terminates downwardly at a desired maximum electrolyte level such as will leave an adequate gas collection space within or beneath the cover and above the electrolyte. During the filling operation the general electrolyte level first rises to the end of the tubular extension, then due to the trapping of gases in the gas collection space, any additional increment of water or electrolyte will rise rapidly in the tubular extension, thus giving an overfill signal.

Various types of devices operating in this way have been suggested, most of them employing valves of different kinds which permit the escape of gases from the gas collection space when the filler cap is in closed position. An object of my invention is the provision of a non-overfill structure of simpler and therefore less expensive construction which nevertheless gives an overfilling signal, is not liable to get out of repair, is wholly safe in operation, and is not dependent upon manipulation, care or attention for its operability. It is an object of my invention to avoid the use of tappet valves or mechanically operated valves. It is an object of my invention to provide a structure in which the filling opening is not obstructed, and does not present parts liable to impede the insertion of a filling tube. It is an object of my invention to provide a structure having no moving parts and therefore not liable to displacement or loss of parts.

These and other objects of my invention which will be set forth hereinafter or will be apparent to one skilled in the art upon reading these specifications, I accomplish by that certain construction and arrangement of parts of which I shall now describe exemplary embodiments, reference being had to the drawing which forms a part hereof and in which.

In the practice of my invention I provide first a filler well having the aforesaid tubular extension for fixing the desired maximum electrolyte level. In a position on the cell cover displaced from the filler well I provide another well or space, communicating with the interior of the cell cover at its lower end, and also communicating with the outer air at the top. In this way I provide a means which during filling prevents the escape of gas in such quantity as to cause the electrolyte or water to rise within the filler well at ordinary or normal rates of filling. The said means is such, however, as to permit the escape of gases at the ordinary rates of gas evolution in the battery. I may in addition provide means whereby the evolution of gases at extraordinary rates in the battery may be relieved.

Figure 1:
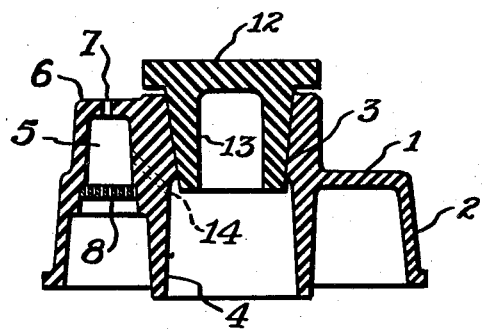
Figure 1 is a transverse sectional view through an exemplary cell cover embodying my invention.

In Fig. 1 I have indicated at 1 the body of a cell cover having the usual skirt 2. The cell cover has a filler well 3 with the tubular extension 4 aforesaid. The second mentioned space which is preferably though not necessarily in the form of an inverted well, is shown at 5, and it will be seen that this well, open beneath, communicates with the hollow interior of the cell cover at a point well above the maximum electrolyte level. In the form indicated, the bottom portions 6 of the inverted well extend up above the general level of the top of the cell cover; but this is not a necessary limitation upon my invention. Moreover, although I have shown the second well adjacent the filler well, it may occupy any unobstructed portion of the top of the cell cover. Also, while I have shown in section an exemplary type of cell cover it will be evident to the skilled worker in the art that my invention is applicable to cell covers of all types.

In the top of the inverted well I preferably provide a gas vent opening 7.

Figure 2:
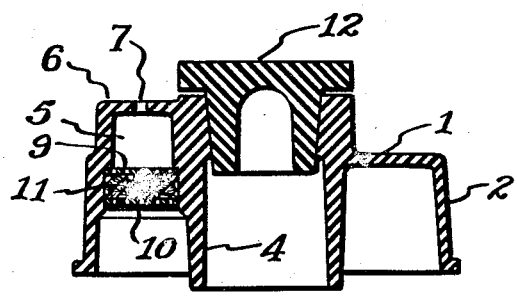
Figure 2 is a similar view showing a modification of my invention.

The cell cover as thus far described is an article conveniently and readily made by ordinary molding processes. In the well, I provide as aforesaid, means obstructing the passage of gas which as shown in Fig. 2, is a disc-shaped member 8 of porous character wedged into or otherwise closing the downwardly open portion of the inverted well. Porous materials resistant to the action of storage battery electrolyte may be employed in wide variety. I have found, for example, that a type of hard or semi-hard rubber obtainable on the market in thin sheets perforated with a multitude of fine openings serves the purpose very well; but it is not necessary to employ a self-sustaining pervious material. In Fig. 2, where like parts have been given like index numerals, I have shown a pair of perforated washers 9 and 10 between which there is a filling 11 of such a porous material as glass fibers. The perforations in the washers 9 and 10 may be so large as to exert substantially no restraining action on the passage of gases; and the degree to which the porous, fibrous material 11 is compressed therebetween will regulate the degree of resistance interposed to the passage of gases. Instead of employing two washers 9 and 10, I may use but one, and may fill the entire space of the well above the washer with the restrictive substance, e. g. glass wool. The washer or washers may have a number of perforations or a single perforation of sufficient area.

The operation of the device will be evident. As soon as the electrolyte reaches the end of the extension 4, it will rise therein during a continuation of the filling operation, thus providing an overfill signal. The reason for this is that the escape of gas through the member 8 or its equivalent, or the assembly 9, 10 and 11 or its equivalent occurs at a slower rate than the normal rate at which water or electrolyte is poured into the battery through the filler well. Yet when the filler cap is in place the rate of passage of gases through the restraining means and through the gas venting perforation 7 will be sufficient to take care of the evolution of the gases within the battery. The particular resistance of the restraining means should be considered when it is wet. During the operation of the battery, both from the fine spray which is occasioned by bubbling, and in rarer instances from actual splashing of the electrolyte as occurs in automotive storage batteries, the restraining means will be wetted with electrolyte. Moreover, even when the battery is not subjected to vibration, the restraining means tends to stay wetted, possibly due in part to the affinity of sulphuric acid for water, and the relatively non-volatile character of sulphuric acid. Porous substances which in an absolutely dry condition might offer too little resistance to the passage of gases will nevertheless operate with entire satisfaction when wetted, for reasons which will be clear.

I prefer to provide in connection with my cell covers means for taking care of an extraordinary evolution of gas such as may occur during overcharge or during the operation of the battery under conditions of extreme temperature. I preferably thus provide something in the nature of safety valve means which may take any one of a number of forms. An actual pressure relief valve could be provided at another point in the cell cover, or the restraining means in the well could be made to blow under conditions of heightened pressure, as by providing a groove in the well above the restraining means, and inserting the restraining means relatively loosely, the groove providing a path around the restraining means after its position has changed, or by employing, instead of an "inverted" well, a well restricted below and having its largest opening at the top, and fitted there with a releasable washer. However, it is an advantage of my invention that, the cell cover being vented elsewhere than at the filler opening, I may employ a filler cap of imperforate character and capable of serving as safety means in the event of undue pressure. In the figures I have indicated at 12 a filler cap which may conveniently be made of relatively soft rubber, Neoprene, Koroseal, or even of the same substance as the cell cover, which is imperforate, and which has a slightly tapering extension 13 adapted to fit into a correspondingly tapered upper portion of the filler well. Where this type of filler cap is employed it is not necessary to thread either the filler cap or the filler well, nor is it necessary to provide gas vent perforations or a splash washer in the filler cap. The cost of manufacture of the parts therefore becomes less, and an appreciable saving is effected through the use of my invention. The filler cap is capable of being dislodged from the filler opening in the event of excess pressure beneath the cell cover. My invention, however, does not preclude the use of a threaded opening for the filler well and the threaded filler cap of the usual vented construction. Unless the filling has been very carelessly done, the use of a vented filler cap will permit the venting of gases without loss or spraying of electrolyte. I may, if desired, provide a drain 14 into the filler well from the portion of the inverted well located above the restraining means, to drain back into the filler well any quantity of electrolyte driven through the restraining means. This, however, is not ordinarily necessary.

Modifications may be made in my invention without departing from the spirit of it. Having thus described my invention what I claim as new and desire to secure by Letters Patent is:

1. In a cell cover, a body having a filler opening in the form of a well with a tubular extension terminating downwardly at a desired electrolyte level, said cover having a gas vent opening at a point removed from said filler well, and means on the downward side of said gas vent opening to restrain the passage of gases therethrough to a rate less than the normal rate of addition of water to said storage battery through said filler well, said restraining means comprising a porous material impervious to the action of storage battery electrolyte.

2. In a cell cover, a body having a filler opening in the form of a well with a tubular extension terminating downwardly at a desired electolyte level, said cover having a gas vent opening at a point removed from said filler well, and means on the downward side of said gas vent opening to restrain the passage of gases therethrough to a rate less than the normal rate of addition of water to said storage battery through said filler well, said restraining means comprising a porous material impervious to the action of storage battery electrolyte, and an imperforate filler cap for said filler opening having nonthreaded engagement therewith and adapted to be displaced under conditions of abnormal gas pressure on the underside of said cell cover.

3. In a cell cover, a body having a filler opening in the form of a well with a tubular extension terminating downwardly at a desired electrolyte level, said cover having a gas vent opening at a point removed from said filler well, and means on the downward side of said gas vent opening to restrain the passage of gases therethrough to a rate less than the normal rate of addition of water to said storage battery through said filler well, said restraining means comprising a porous material impervious to the action of storage battery electrolyte, and an imperforate filler cap for said filler opening having nonthreaded engagement therewith whereby it is adapted to be displaced under conditions of abnormal gas pressure on the underside of said cell cover, said filler cap being an imperforate cap of soft rubber.

4. In a cell cover a body having a filler opening in the form of a well with a tubular extension depending therefrom, said body being configured to form an inverted well at a point displaced from said filler opening, said inverted well being open beneath and communicating with the interior of said cell cover at a point above the bottom of said tubular extension, said inverted well having means for venting gases to the atmosphere, and means in said inverted well for restraining the passage of gases to a rate less than the normal rate of introduction of water through said filler well during the operation of filling, said restraining means comprising a porous material impervious to the action of storage battery electrolyte.

5. In a cell cover, a body having a filler opening in the form of a well with a tubular extension depending therefrom, said body being configured to form an inverted well at a point displaced from said filler opening, said inverted well being open beneath and communicating with the interior of said cell cover at a point above the lower end of said tubular extension, said inverted well having means for venting gases to the atmosphere, and means in said inverted well for restraining the passage of gases to a rate less than the normal rate of introduction of water through said filler well during the operation of filling, said means comprising a disc of porous material impervious to storage battery electrolyte.

6. In a cell cover a body having a filler opening in the form of a well with a tubular extension depending therefrom, said body being configured to form an inverted well at a point displaced from said filler opening, said inverted well being open beneath and communicating with the interior of said cell cover at a point above the lower end of said tubular extension, said inverted well having means for venting gases to the atmosphere, and means in said inverted well for restraining the passage of gases to a rate less than the normal rate of introduction of water through said filler well during the operation of filling, said means comprising a disc of porous material impervious to storage battery electrolyte, being a disc of hard rubber perforated with minute holes and engaged in the open bottom of said inverted well.

7. In a cell cover a body having a filler opening in the form of a well with a tubular extension depending therefrom, said body being configured to form an inverted well at a point displaced from said filler opening, said inverted well being open beneath and communicating with the interior of said cell cover at a point above the lower end of said tubular extension, said inverted well having means for venting gases to the atmosphere, and means in said inverted well for restraining the passage of gases to a rate less than the normal rate of introduction of water through said filler well during the operation of filling, said means comprising a porous, fibrous material.

8. In a cell cover a body having a filler opening in the form of a well with a tubular extension depending therefrom, said body being configured to form an inverted well at a point displaced from said filler opening, said inverted well being open beneath and communicating with the interior of said cell cover at a point above the lower end of said tubular extension, said inverted well having means for venting gases to the atmosphere, and means in said inverted well for restraining the passage of gases to a rate less than the normal rate of introduction of water through said filler well during the operation of filling, said means comprising a porous, fibrous material, and perforated means for retaining said porous fibrous, material in said well.

9. In a cell cover, a body having a filler opening in the form of a well with a tubular extension depending therefrom, said body being configured to form an inverted well at a point displaced from said filler opening, said inverted well being open beneath and communicating with the interior of said cell cover at a point above the lower end of said tubular extension, said inverted well having means for venting gases to the atmosphere, and means in said inverted well for restraining the passage of gases to a rate less than the normal rate of introduction of water through said filler well during the operation of filling, said means comprising glass fibers and perforated retaining means for said glass fibers.

10. In a cell cover, a body having a filler opening in the form of a well with a tubular extension depending therefrom, said body being configured to form an inverted well at a point displaced from said filler opening, said inverted well being open beneath and communicating with the interior of said cell cover at a point above the lower end of said tubular extension, said inverted well having means for venting gases to the atmosphere, and means in said inverted well for restraining the passage of gases to a rate less than the normal rate of introduction of water through said filler well during the operation of filling, said restraining means comprising a porous material impervious to the action of storage battery electrolyte, and an imperforate filler cap for said filler well having a non-threaded engagement therewith whereby it is adapted to be displaced under conditions of heightened pressure within said cell cover.

11. In a cell cover, a body having a filler opening in the form of a well with a tubular extension depending therefrom, said body being configured to form an inverted well at a point displaced from said filler opening, said inverted well being open beneath and communicating with the interior of said cell cover at a point above the lower end of said tubular extension, said inverted well having means for venting gases to the atmosphere, and means in said inverted well for restraining the passage of gases to a rate less than the normal rate of introduction of water through said filler well during the operation of filling, said means comprising a porous, fibrous material, and an imperforate filler cap of soft rubber having non-threaded engagement in said filler well and adapted to be displaced therefrom upon the occurrence of an increase of pressure within said cell cover.

12. In a cell cover, a body having a filler opening in the form of a well with a tubular extension depending therefrom, said body being configured to form an inverted well at a point displaced from said filler opening, said inverted well being open beneath and communicating with the interior of said cell cover at a point above the lower end of said tubular extension, said inverted well having means for venting gases to the atmosphere, and means in said inverted well for restraining the passage of gases to a rate less than the normal rate of introduction of water through said filler well during the operation of filling, said means comprising glass fibers and perforated retaining means for said glass fibers, said filler well having a non-threaded tapering opening and a tapering, imperforate, soft rubber filler cap adapted for engagement therein.

McCONNELL SHANK.